Nov. 13, 1928.
A. C. BADGER
1,691,040
EXPANSION JOINT WITH REGULATING MEANS
Filed April 10, 1922
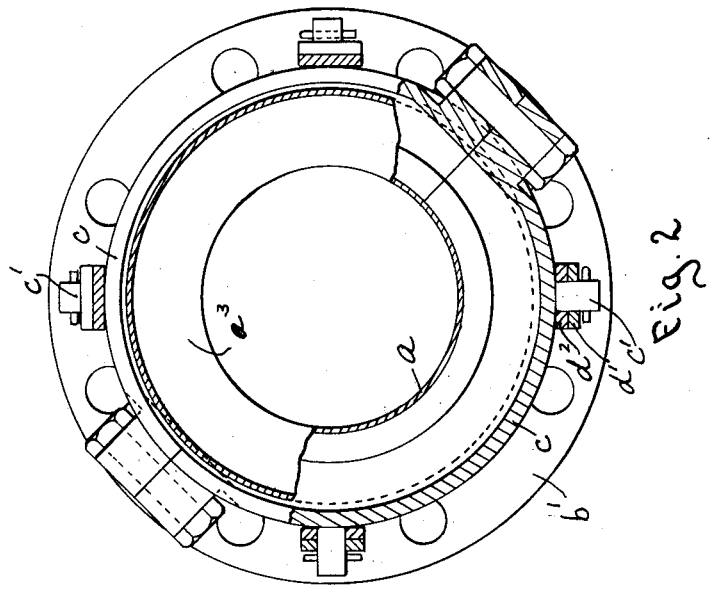
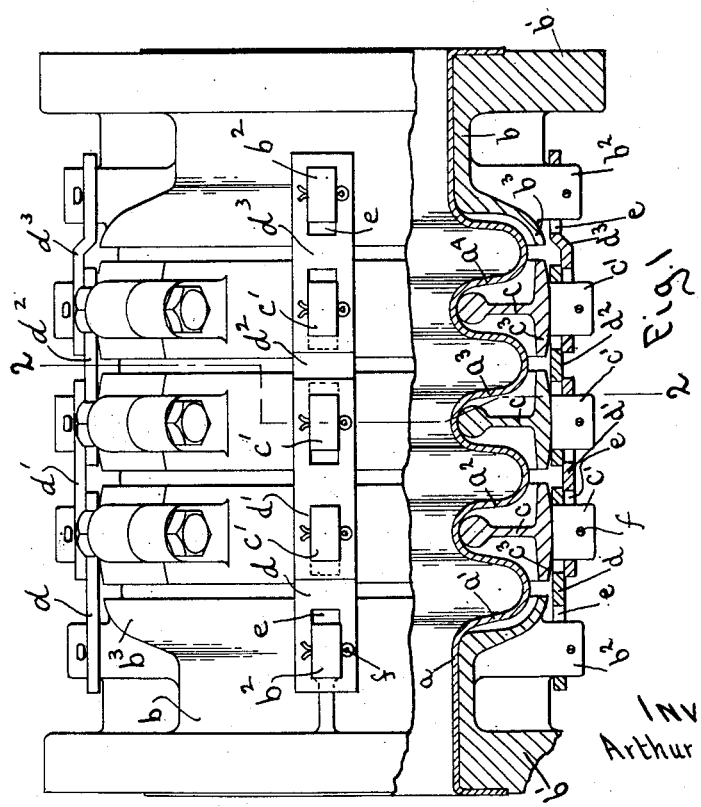
INVENTOR
Arthur C. Badger Patented Nov. 13, 1928.

1,691,040

UNITED STATES PATENT OFFICE.

ARTHUR C. BADGER, OF NEWTON, MASSACHUSETTS.

EXPANSION JOINT WITH REGULATING MEANS.

Application filed April 10, 1922. Serial No. 551,057.

The present invention relates to joints adapted to be interposed between lengths or sections of pipe for the purpose of taking care of expansion and contraction of such piping, due to differences of temperature. More particular the special object of the invention is to provide means in connection with an expansion joint (which may be new or old in itself) for regulating or equalizing the amount of distortion in different parts of the joint. To explain this purpose more clearly, let me say that with expansion joints of the corrugated type, for instance, it is possible when the joint is elongated, due to contraction of the connecting pipe sections, for the elongation to take place wholly or mainly, or at least to a disproportionate extent, in one or a few only of the entire number of corrugations, instead of equally throughout all the corrugations. Indeed, such localized distortion is more likely to happen than is an equal distribution of the distortion because of the impossibility in practice of making all the bends or folds of the corrugated pipe equally stiff, and when such unequal distortion does occur it results in an excessive come and go of that part of the joint with eventual crystallization and failure of the part which is excessively distorted, and in extreme instances may result in the drawing out almost to the disappearing point of the corrugation in which the excessive distortion is localized.

Localization to an excessive degree of the shortening movement of such joints with expansion of the pipe sections has been limited in joints heretofore made by reinforcing or regulating rings located either outside or inside of the joint and having flanges which come into contact with one another before any corrugation can be folded together more than a certain amount. An instance of a joint having such regulating rings is disclosed in my prior Patent No. 1,052,709 dated February 11, 1913; but no effective means have ever been furnished, so far as I know, for limiting and distributing the lengthening out effect of the several corrugations when the joint is elongated. Provision of means for this end is the particular object of the present invention and is the subject-matter in which the invention consists. Although the essential principles of means referred to may be embodied in many different forms I have chosen for illustration of the invention in this application the form which at present I prefer to others, and I will now describe such preferred embodiment with reference to the drawings forming a part of this application.

In the drawings:

Figure 1 is an elevation and in part a longitudinal section of an expansion joint containing the form of the invention hereinbefore referred to.

Figure 2 is a cross section of the joint on line 2—2 of Figure 1.

Like reference characters indicate the same parts wherever they occur in all the figures.

The body of the joint comprises a tube or body $a$ of copper or other sufficiently ductile and flexible metal, which is also thin enough to be bent repeatedly without harmful effect in the conditions of use. The tube is corrugated at $a^1$, $a^2$, $a^3$, and $a^4$ to form similar parallel and circumferential ridges and valleys, the sides and curves of which are adapted to bend as the joint is lengthened or shortened in the axial direction.

The ends of the tube $a$ are passed through rings $b$, $b$ which have flanges $b'$, $b'$ for attachment to complemental flanges of pipe sections or couplings. Such end rings are made of metal or other material having strength and rigidity enough for the purpose last named. In the valleys between the corrugations are seated reinforcing or regulating rings $c$, $c$, $c$ which prevent the valleys of the corrugations being pressed out or distorted away from the axis by excess internal pressure, these rings here having the function and purpose described in my said prior patent.

In order to accomplish the object of my present invention I provide lugs $b^2$ on the rings $b$ and lugs $c'$ on the rings $c$, said lugs being preferably arranged, for the sake of simplicity and economy, in alined rows or series. Links $d$, $d^1$, $d^2$ and $d^3$ are engaged with adjacent lugs of each row. In other words, each link engages and connects lugs on two adjacent rings. In the form here shown the lugs have holes $e$ through them enough longer than the width of the lugs to permit the limited amount of relative motion between the links and rings previously determined as desirable. These holes permit the links to be assembled with the rings by being simply slipped over the lugs, and when so placed they are retained by cotter pins $f$ or equivalent keys passed through transverse holes in the lugs and overlying the adjacent parts of the links as shown in Figure 1.

Various numbers of rows or sets of lugs and links may be provided. I have here shown four such sets equi-distantly distributed around the circumference of the joint, but this precise number is not obligatory. Neither is it necessary that all the lugs and links of any one series be in line for the link connecting any two rings may be out of line with a link connecting two other rings, if any virtue is found in such an arrangement. The alined arrangement is preferable on the ground of economy and simplicity because the same lug on an intermediate ring is adapted to engage the links which connect with the two rings on either side of it.

The drawings show the expansion joint in its most elongated condition. It is evident that when this condition is attained all of the corrugations are equally widened, and that no one corrugation can be disproportionately widened, because further elongating movement is transmitted by the links and rings to the next corrugation when the utmost predetermined elongation of any one corrugation has occurred. Assuming, for example, that the corrugation $a^1$ is weaker than the others, then in case of an elongation the left hand ring $b$ will move away from the adjacent ring $c$ until the lost motion of the lugs $b^2$ and $c'$ in the holes $e$ of the link $d$ is all taken up. Then no further spreading out of this corrugation is possible, but further movement of the ring $b$ in the same direction draws the left hand ring $c$ with it in equal measure, and the distortion of the flexible tube is then transferred to the most flexible of the remaining corrugations, with or without simultaneous distribution among the remainder until, at the limit of elongation, all corrugations are equally widened.

In the shortening action of the joint, the steps above referred to are reversed. Although in the form of joint here illustrated the rings $b$ have flanges $b^3$ and the rings $c$ have flanges $c^3$ adapted to come into contact with one another to limit the collapsing distortion of the corrugation, nevertheless the links may serve the purpose of limiting and distributing the local collapsing distortion as well as elongation, and in that case the rings may be simplified and reduced in weight by elimination of these flanges. On the other hand, when the rings are availed of to limit endwise collapse, the links may be considered as tension members to limit and distribute elongation, wherefore rigid links are not necessary, but flexible tie members of any sort may be used.

In view of this fact I prefer to use the term "coupling" as a term of generic significance to designate either the specific rigid links shown in these drawings or any flexible or other tie member having the function of limiting elongational distortion of the several corrugations and with or without capacity or ability for limiting collapsing distortion.

The intermediate rings $c$ are shown in Figure 2 with appropriate means for applying them detachably to the body of the joint. In cases where reinforcement of the corrugations against superior external pressure is required internal rings may be used as shown in my prior patent, before designated, and the limit couplings used in connection with such internal rings or with an additional outer set of rings.

Whether the regulating means here described is applied inside or outside the joint, those parts of the corrugations occupied by the rings to which the links are coupled are the grooves or valleys of the corrugations and the parts which project between rings are ridges, whether external or internal. In other words, the same part of the corrugation may be either a ridge or a groove (or valley) according as the point of view is from the outside or inside of the tube.

In one manner of contemplating the invention the links $d$, $d^1$, $d^2$, $d^3$ may be considered as a flexible tying device of which the end members are connected to the endmost rings of the joint, and all the members are joined flexibly to one another by the lugs $c'$ of the intermediate rings, such lugs being, in effect, pintles of a link chain. The lugs are also parts of means, or connected with means (namely, the rings $c$) which are so engaged with the tube, beside the corrugation or within the alined grooves thereof, as to apply restraint from the link chain to the local distortion of separate corrugations.

What I claim and desire to secure by Letters Patent is:

1. An expansion joint comprising a flexible corrugated tube, rings secured to the end parts of said tube, a series of overlapping connected links, the endmost ones of which are engaged with lost motion to said end rings and all of which have limited ability for movement lengthwise of the joint with respect to each other, and means at the overlaps of adjacent links for engaging the tube between corrugations thereof to limit independent distortion of the separate corrugations.

2. An expansion joint comprising a corrugated tubular body of flexible material, ring surrounding said body and occupying the hollows adjacent the several corrugations, said rings having lugs, and links, each embracing the lugs of two adjacent rings and having openings in which said lugs are received with provision for lost motion lengthwise of the joint.

3. An expansion joint comprising a corrugated tubular body of flexible material, end rings secured to the ends of said body, and reinforcing rings occupying the valleys or grooves of said body, combined with means for limiting the distortion of single corrugations of said body, such means comprising a coupling link having apertures and projections on two of the rings occupying said apertures, one of the apertures being longer than the projection which occupies it and the end of such aperture being the limit of expanding distortion of the corrugation between said rings.

In testimony whereof I have affixed my signature.

ARTHUR C. BADGER.